US011851516B2

(12) United States Patent
Matsuoka et al.

(10) Patent No.: US 11,851,516 B2
(45) Date of Patent: Dec. 26, 2023

(54) PHOSPHORYLCHOLINE GROUP-CONTAINING POLYSILOXANE MONOMER

(71) Applicant: NOF CORPORATION, Tokyo (JP)

(72) Inventors: Yosuke Matsuoka, Kawasaki (JP); Akane Katori, Kawasaki (JP); Norio Iwakiri, Kawasaki (JP); Shu Takashima, Kawasaki (JP); Ryuya Gotanda, Kawasaki (JP); Nobuyuki Sakamoto, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 693 days.

(21) Appl. No.: 17/045,032

(22) PCT Filed: Apr. 4, 2019

(86) PCT No.: PCT/JP2019/014900
§ 371 (c)(1),
(2) Date: Oct. 2, 2020

(87) PCT Pub. No.: WO2019/194264
PCT Pub. Date: Oct. 10, 2019

(65) Prior Publication Data
US 2021/0189044 A1  Jun. 24, 2021

(30) Foreign Application Priority Data
Apr. 5, 2018  (JP) .................. 2018-073052

(51) Int. Cl.
| | | |
|---|---|---|
| *C08G 77/20* | (2006.01) | |
| *C08F 290/06* | (2006.01) | |
| *C08F 290/14* | (2006.01) | |
| *C08G 77/30* | (2006.01) | |
| *C08G 77/395* | (2006.01) | |
| *G02C 7/04* | (2006.01) | |

(52) U.S. Cl.
CPC ...... *C08F 290/068* (2013.01); *C08F 290/148* (2013.01); *C08G 77/20* (2013.01); *C08G 77/30* (2013.01); *C08G 77/395* (2013.01); *G02C 7/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,346,594 | B1 * | 2/2002 | Watanabe | G02B 1/043 351/159.01 |
| 2006/0074487 | A1 * | 4/2006 | Gilg | A61F 2/147 623/4.1 |

FOREIGN PATENT DOCUMENTS

WO  WO-2010147779 A2 * 12/2010 ....... A61F 13/00017

* cited by examiner

*Primary Examiner* — Peter A Salamon
(74) *Attorney, Agent, or Firm* — Sughrue Mion, PLLC

(57) ABSTRACT

Provided is a monomer suitable for application to an ophthalmic device, the monomer showing high surface hydrophilicity, a high oxygen transmissibility, and appropriate mechanical strength when copolymerized with a polymerizable monomer, such as a hydrophilic monomer. It has been recognized that a phosphorylcholine group-containing polysiloxane monomer can solve the problems.

10 Claims, No Drawings

PHOSPHORYLCHOLINE GROUP-CONTAINING POLYSILOXANE MONOMER

CROSS REFERENCE TO RELATED APPLICATIONS

This application is a National Stage of International Application No. PCT/JP2019/014900 filed Apr. 4, 2019, claiming priority based on Japanese Patent Application No. 2018-073052 filed Apr. 5, 2018 which is incorporated herein by reference.

TECHNICAL FIELD

The present invention relates to a polymerizable phosphorylcholine group-containing polysiloxane monomer that may be used for producing an ophthalmic device, such as a contact lens, an intraocular lens, or an artificial cornea, by being copolymerized with a hydrophilic monomer and the like.

BACKGROUND ART

A silicone hydrogel is a material that puts little strain on the eyes by virtue of its high oxygen permeability, and that is hence currently widely used for ophthalmic lenses, such as contact lenses. Meanwhile, the silicone hydrogel contains a water-repellent silicone, and hence is liable to lack wettability or lubricity. Therefore, investigations have been made on surface hydrophilization by a surface modification method and surface hydrophilization by mixing a hydrophilic polymer into a lens composition before curing thereof. At present, there exist various methods of providing a silicone hydrogel lens that has optical transparency and desired lubricity, allows adjustment of an elastic modulus, and has high oxygen permeability.

During wearing of the silicone hydrogel lens, a protein, a lipid, or the like in a tear serves as a cause of deterioration of wearing sensation by being adsorbed onto a surface of the lens. For the purpose of reducing the adsorption thereof, a lens using a phosphorylcholine group-containing methacrylic ester monomer MPC having contamination resistance (Patent Literature 1 and Non Patent Literature 1) is commercially available as a non-silicone hydrogel lens.

In Patent Literature 2, there is a disclosure that a phosphorylcholine group, which has contamination resistance, is incorporated into a silicone hydrogel lens. In Patent Literature 2, there is a disclosure of a silicone hydrogel produced by random copolymerization of 2-methacryloyloxyethylphosphorylcholine (MPC) and bis(trimethylsiloxy)methylsilylpropylglycerol methacrylate (SiGMA), which is a polysiloxane monomer having a hydroxy group.

In general, when MPC is used by being copolymerized in the introduction of a phosphorylcholine group into a silicone hydrogel lens, there is a need to overcome phase separation between a highly hydrophilic MPC moiety and a hydrophobic silicone moiety in a silicone hydrogel backbone. Accordingly, there still remains room for improvement in stable production of silicone hydrogel lenses, and it is important to design a polysiloxane monomer having introduced therein a phosphorylcholine group.

In Patent Literature 3, there is a disclosure of a polysiloxane monomer having phosphorylcholine-analogous groups introduced at both ends of a silicone chain. In addition, in each of Patent Literature 4 and Patent Literature 5, there is a disclosure of a polysiloxane monomer having phosphorylcholine groups introduced at both ends thereof. In each of the polysiloxane monomers having those structures, a polydimethylsiloxane moiety of a main chain is not modified, and hence it cannot necessarily be said that sufficient performance is obtained in terms of compatibility with a hydrophilic monomer and transparency of a lens to be obtained. Accordingly, there is room for improvement.

In Patent Literature 6, there is a disclosure of an ABA-type MPC/siloxane block polymer. The block polymer is extremely useful when used for surface treatment. However, when the block polymer is used as a crosslinker for a lens, its block structure results in a large phase-separated structure of a hydrophilic phase and a hydrophobic phase, and hence there is a risk in that the hydrogel is liable to be clouded.

In Patent Literature 7, there is a disclosure of a silicone having a phosphorylcholine group introduced into a silicone side chain thereof via an amino group. Despite having the phosphorylcholine group, the silicone cannot necessarily be said to be safe owing to the presence of the amino group.

In Patent Literature 8, there is a proposal of a polysiloxane monomer having a phosphorylcholine group introduced via an ester group. Owing to having the ester group, the monomer cannot be said to have high compatibility with a hydrophilic monomer, such as 2-hydroxyethyl (meth)acrylate, which has a hydroxy group.

CITATION LIST

Patent Literature

[PTL 1] WO 92/07885 A1
[PTL 2] JP 2007-197513 A
[PTL 3] WO 2010/147779 A2
[PTL 4] WO 2001/057047 A1
[PTL 5] WO 2012/1043349 A1
[PTL 6] WO 2008/023604 A1
[PTL 7] JP 2004-175830 A
[PTL 8] JP 2013-139567 A

Non Patent Literature

[NPL 1] "Six month clinical evaluation of a biomimetic hydrogel contact lens," The CLAO Journal, 23(4): 226-36 (1997)

SUMMARY OF INVENTION

Technical Problem

The present invention provides a phosphorylcholine group-containing polysiloxane monomer that shows high surface hydrophilicity, a high oxygen transmissibility, and appropriate mechanical physical properties (particularly suitable for application to an ophthalmic device) when copolymerized with a polymerizable monomer, such as a hydrophilic monomer.

Solution to Problem

The inventors of the present invention have recognized that a phosphorylcholine group-containing polysiloxane monomer represented by the formula (1) can solve the problems. Thus, the present invention has been completed.

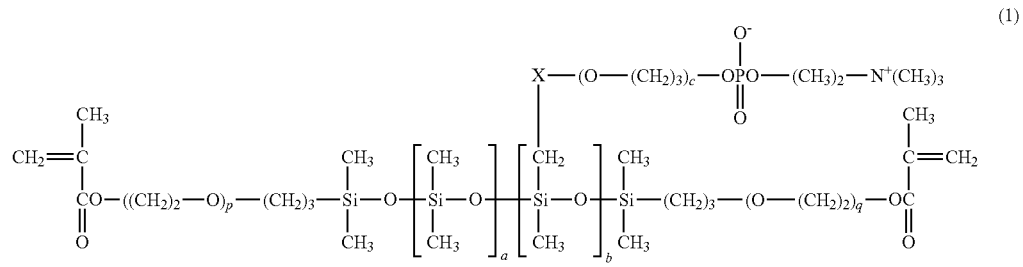

In the formula, "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

That is, the present invention is as described below.

1. A phosphorylcholine group-containing polysiloxane monomer, which is represented by the formula (1):

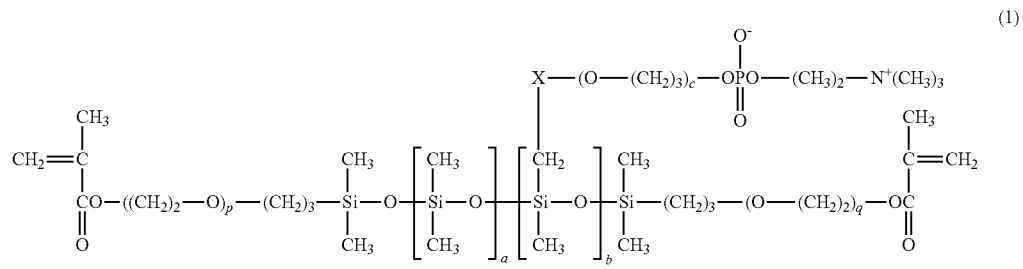

where "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

2. A method of producing a phosphorylcholine group-containing polysiloxane monomer represented by the formula (1), the method including a step of subjecting a hydrosilyl group-containing di-methacrylate-terminated silicone represented by the formula (4) and an allyl group-containing phosphorylcholine compound represented by the formula (5) to an addition reaction:

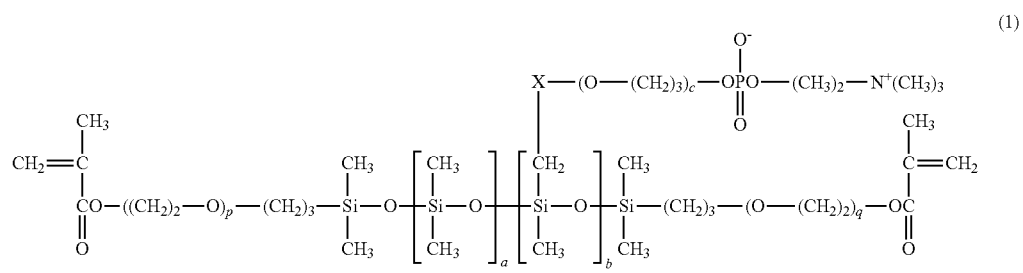

where "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—;

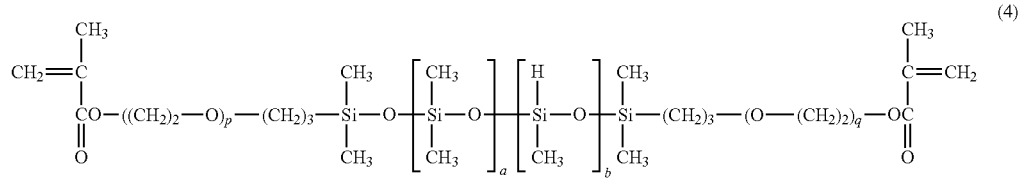

where "a" represents an integer of from 20 to 500, "b" represents an integer of from 1 to 70, and "p" and "q" each represent 0 or 1;

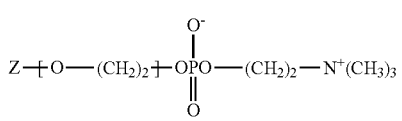

where "c" represents 0 or 1, and Z represents $CH_2=CHCH_2-$ or $CH_2=CH-$.

3. A monomer composition, including: 10 parts by weight to 60 parts by weight of a phosphorylcholine group-containing polysiloxane monomer represented by the formula (1); and 40 parts by weight to 90 parts by weight of one kind or a plurality of kinds of hydrophilic monomers:

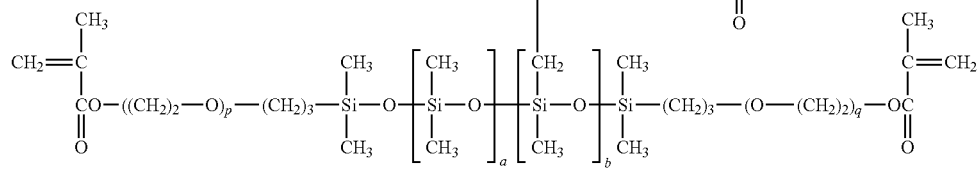

where "a" represents an integer of from 20 to 500, "b" represents an integer of from 1 to 70, "c" represents 0 or 1, "p" and "q" each represent 0 or 1, and X represents $-CH_2-$ or $-CH_2CH_2-$.

4. The monomer composition according to the above-mentioned item 3, wherein the hydrophilic monomers are any one or more selected from the group consisting of 2-hydroxyethyl (meth)acrylate, N-vinylpyrrolidone, N,N-dimethylacrylamide, 2-(methacryloyloxyethyl)-2-(trimethylammonioethyl) phosphate, methyl methacrylate, and hydroxypropyl (meth)acrylate.

5. A polymer, which is obtained by polymerizing the monomer composition of the above-mentioned item 3 or 4.

6. A polymer, which is obtained by polymerizing the monomer composition of the above-mentioned item 3 or 4, wherein the hydrophilic monomers are N-vinylpyrrolidone, 2-(methacryloyloxyethyl)-2-(trimethylammonioethyl) phosphate, and hydroxypropyl (meth)acrylate.

7. A polymer, which is obtained by polymerizing the monomer composition of the above-mentioned item 3 or 4, wherein the hydrophilic monomers are N-vinylpyrrolidone, 2-(methacryloyloxyethyl)-2-(trimethylammonioethyl) phosphate, and 2-hydroxyethyl (meth)acrylate.

8. A polymer, which is obtained by polymerizing the monomer composition of the above-mentioned item 3 or 4, wherein the hydrophilic monomers are N-vinylpyrrolidone, 2-(methacryloyloxyethyl)-2-(trimethylammonioethyl) phosphate, and N,N-dimethylacrylamide.

9. The composition according to any one of the above-mentioned items 1 to 4, wherein the composition is a composition for an ophthalmic device.

10. An ophthalmic device, including the polymer of any one of the above-mentioned items 5 to 8.

Advantageous Effects of Invention

The phosphorylcholine group-containing polysiloxane monomer of the present invention has a high silicone content and has high hydrophilicity by virtue of having a phosphorylcholine group. Accordingly, the phosphorylcholine group-containing polysiloxane monomer simultaneously satisfies surface hydrophilicity, appropriate mechanical strength, and oxygen permeability when copolymerized with a polymerizable monomer, such as a hydrophilic monomer, and hence is useful as a polysiloxane monomer to be used as a raw material for an ophthalmic device.

DESCRIPTION OF EMBODIMENTS

The present invention relates to a polysiloxane monomer containing a phosphorylcholine group, which is a zwitterionic group. More specifically, the polysiloxane monomer containing a phosphorylcholine group of the present invention relates to a polymerizable silicone compound containing a silicone moiety and further containing a zwitterionic phosphorylcholine group in the molecule and two vinyl end groups, and having a number-average molecular weight of from 2,000 to 50,000. The number-average molecular weight of the polysiloxane monomer containing a phosphorylcholine group of the present invention only needs to be from 2,000 to 50,000, and is preferably from 4,600 to 42,000.

The vinyl groups of the phosphorylcholine group-containing polysiloxane monomer of the present invention are each adjacent to a carbonyl group. Accordingly, the phosphorylcholine group-containing polysiloxane monomer has good copolymerizability with a monomer to be generally used for an ophthalmic device, such as a (meth)acrylic ester monomer or a (meth)acrylamide monomer.

The phosphorylcholine group-containing polysiloxane monomer of the present invention has a phosphorylcholine moiety, which is a zwitterionic group, in a side chain thereof, and hence has high compatibility with a hydrophilic monomer and provides a transparent lens by being polymerized with the monomer. Further, surface hydrophilicity is achieved in the lens, and hence the phosphorylcholine group-containing polysiloxane monomer is also preferred as a crosslinker for contact lenses.

The term "ophthalmic device" as used in the present invention encompasses a contact lens, a soft contact lens, a hard contact lens, an intraocular lens, and an artificial cornea, but is not particularly limited thereto.

(Phosphorylcholine Group-Containing Polysiloxane Monomer of the Present Invention)

The phosphorylcholine group-containing polysiloxane monomer of the present invention is a phosphorylcholine group-containing polysiloxane monomer represented by the following formula (1).

"a" and "b" are not particularly limited as long as "a" and "b" fall within the above-mentioned ranges. However, "a" represents from 20 to 500, preferably from 50 to 300, more preferably from 80 to 200, and "b" represents from 1 to 70, preferably from 2 to 40, more preferably from 3 to 15.

(Synthesis Method for Phosphorylcholine Group-Containing Polysiloxane Monomer of the Present Invention)

The phosphorylcholine group-containing polysiloxane monomer of the present invention may be synthesized by any of various methods without any particular limitation. The following method is given as an example.

A silicone intermediate represented by the formula (2) to be used for the synthesis of the phosphorylcholine group-containing polysiloxane monomer of the present invention may be synthesized by a known method.

A dual-end hydroxy group-containing siloxane represented by the following formula (2) {e.g., SIB1138.0 from Gelest, Inc. (in the formula (2), p=q=1 and n=0)}, an end hydroxy group-containing disiloxane, such as SIB1145.0 (in the formula (2), p=q=n=0), a dual-end hydroxy group-containing silicone, such as FM-4411 from JNC Corporation (in the formula (2), p=q=1 and n=9), or the like is allowed to react with (meth)acrylic acid chloride in the coexistence of a dehydrochlorinating agent to synthesize a compound having methacrylic groups at both ends thereof represented by the formula (3). An organic amine may be used as the dehydrochlorinating agent. The following organic amine is preferably used: a trialkylamine, such as triethylamine; a

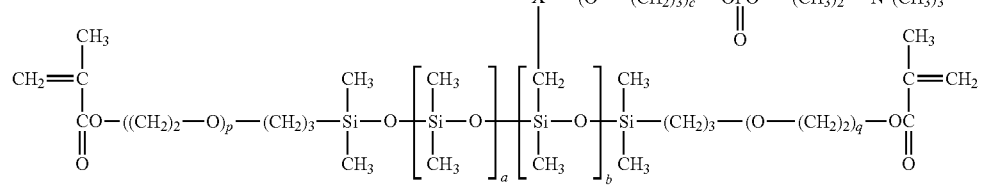

In the formula, "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

dialkylamine, such as diisopropylamine; diazabicycloundecene; or the like. An aprotic solvent may be used at the time of the reaction. Tetrahydrofuran is preferred from the viewpoint of solubility.

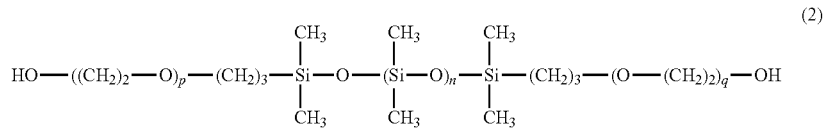
(2)

In the formula, "p" and "q" each represent 0 or 1, and n represents an integer of from 0 to 10.

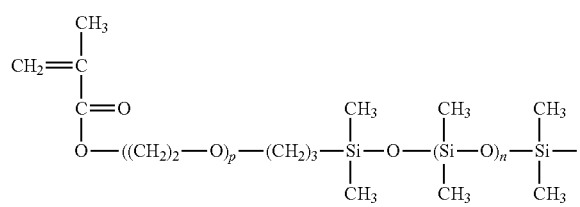
(3)

In the formula, "p" and "q" each represent 0 or 1, and n represents an integer of from 0 to 10.

The compound represented by the formula (3) may be purchased as, for example, FM-7711 from JNC Corporation (p=q=0 and n=9) or DMS-R11 from Gelest, Inc. (p=q=0 and n=9).

Next, the silicone intermediate having methacrylic groups represented by the formula (3) is allowed to react with octamethylcyclotetrasiloxane and 1,3,5,7-tetramethylcyclotetrasiloxane through use of, for example, an acid catalyst, such as trifluoromethanesulfonic acid, to afford a hydrosilyl group-containing silicone intermediate (hydrosilyl group-containing di-methacrylate-terminated silicone) represented by the formula (4). This reaction may be solvent-free, or may use a solvent, such as chloroform.

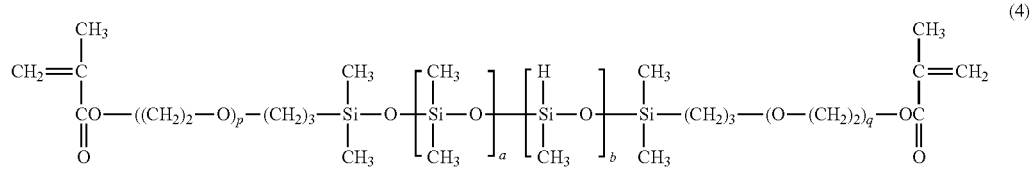
(4)

In the formula, "a" represents an integer of from 20 to 500, "b" represents an integer of from 1 to 70, and "p" and "q" each represent 0 or 1.

"a" and "b" are not particularly limited as long as "a" and "b" fall within the above-mentioned ranges. However, "a" represents from 20 to 500, preferably from 50 to 300, more preferably from 80 to 200, and "b" represents from 1 to 70, preferably from 2 to 40, more preferably from 3 to 15.

The acid catalyst after the reaction is removed by a known method. For example, the acid catalyst may be removed by washing with water or by adsorption with sodium carbonate or the like.

Further, the hydrosilyl group-containing silicone intermediate represented by the formula (4) and a phosphorylcholine group-containing allyl ether represented by the formula (5) are subjected to a hydrosilylation reaction, which is an addition reaction. An excess amount of the compound of the formula (5) is removed with a solvent or the like, and low-boiling point components are removed under reduced pressure. Thus, the phosphorylcholine group-containing polysiloxane monomer of the formula (1) is obtained.

The compound of the formula (5) is obtained by allowing ethylene glycol monoallyl ether to react with 2-chloro-2-oxo-1,3,2-dioxaphospholane (COP) in an aprotic solvent, such as THF, to afford 2-(2-allyloxy)ethoxy-2-oxo-1,3,2-dioxaphospholane, followed by a reaction with trimethylamine in an aprotic solvent, such as acetonitrile.

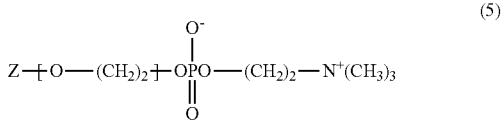
(5)

In the formula, "c" represents 0 or 1, and Z represents $CH_2=CHCH_2-$ or $CH_2=CH-$.

(Monomer Composition of the Present Invention)

A monomer composition of the present invention contains the phosphorylcholine group-containing polysiloxane monomer of the present invention and at least one kind of hydrophilic monomer.

The phosphorylcholine group-containing polysiloxane monomer represented by the formula (1) contained in the monomer composition of the present invention may be polymerized with the hydrophilic monomer and the like using a catalyst or initiator known to a person skilled in the art.

In the monomer composition of the present invention, the content ratio of the phosphorylcholine group-containing polysiloxane monomer represented by the formula (1) of the present invention is from 10 parts by weight to 60 parts by weight with respect to 100 parts by weight of the total amount of the compound of the formula (1) and the hydrophilic monomer. When the content ratio is less than 10 parts by weight, the transparency and oxygen permeability of the polymer to be obtained by the polymerization are reduced, and when the content ratio is more than 60 parts by weight, the surface hydrophilicity of the polymer is reduced.

In the monomer composition of the present invention, the content ratio of the hydrophilic monomer is generally from 40 parts by weight to 90 parts by weight, preferably from 50 parts by weight to 90 parts by weight with respect to 100 parts by weight of the total amount of the compound of the formula (1) and the hydrophilic monomer.

The phosphorylcholine group-containing polysiloxane monomer represented by the formula (1) of the present invention may be used as a monomer raw material for a polymer for forming an ophthalmic device, in order to improve the surface hydrophilicity of the ophthalmic device and control the softness thereof. More specifically, the polysiloxane monomer of the present invention has polymerizable groups at both ends thereof, and hence the softness of the polymer can be adjusted by adjusting the molecular weight of the monomer (a decrease in molecular weight of the monomer makes the polymer harder, and an increase therein makes the polymer softer). In addition, the monomer may be incorporated into a monomer composition for an ophthalmic device in the range of from 10 parts by weight to 60 parts by weight.

That is, a polymer may be formed by mixing the phosphorylcholine group-containing polysiloxane monomer represented by the formula (1) of the present invention with a monomer (in particular, a hydrophilic monomer) that is copolymerizable with the former monomer and is preferably used as a raw material for an ophthalmic device.

In addition, when the polysiloxane monomer of the present invention is used as a raw material for an ophthalmic device, the softness of the ophthalmic device can be controlled.

(Hydrophilic Monomer)

The hydrophilic monomer may be selected, for example, from the group consisting of 2-hydroxyethyl (meth)acrylate, hydroxypropyl (meth)acrylate, 2-hydroxybutyl (meth)acrylate, 4-hydroxybutyl (meth)acrylate, 2-hydroxyethyl acrylamide, N-methyl-2-hydroxyethyl acrylamide, ethylene glycol monovinyl ether, N-vinylpyrrolidone, N,N-dimethylacrylamide, N,N-diethylacrylamide, 2-(methacryloyloxyethyl)-2-(trimethylammonioethyl) phosphate {2-(meth)acryloyloxyethyl-2'-(trimethylammonio) ethyl phosphate}, and mixtures thereof, but is not particularly limited.

When a plurality of kinds of hydrophilic monomers are incorporated into the monomer composition of the present invention, their combination is not particularly limited, but may be exemplified by the following.

N-Vinylpyrrolidone (NVP), 2-(methacryloyloxyethyl)-2-(trimethylammonioethyl) phosphate (MPC), and hydroxypropyl (meth)acrylate (HPMA)

NVP, MPC, and 2-hydroxyethyl (meth)acrylate (HEMA)

NVP, MPC, and N,N-dimethylacrylamide (DMAA)

MPC, HPMA, and DMAA (Other Monomer)

The monomer composition of the present invention may contain, in addition to the above-mentioned essential monomers, another monomer copolymerizable with the phosphorylcholine group-containing polysiloxane monomer represented by the formula (1) of the present invention, and preferably usable as a raw material for an ophthalmic device.

Preferred examples of the other monomer include known monomers each having a carbon-carbon unsaturated bond, such as a (meth)acryloyl group, a styryl group, an allyl group, or a vinyl group. In particular, a monomer having a hydrophilic group, such as a hydroxy group, an amide group, or a zwitterion group, other than the above-mentioned hydrophilic monomer is particularly preferred. Alternatively, a crosslinker may be added as the other monomer as long as the effects of the present invention are not impaired. There are given, for example, 2-hydroxy-3-(tris(trimethylsiloxy)silyl)propyl methacrylate, 4-(2-hydroxyethyl)=1-[3-tris(trimethylsiloxy)silylpropyl]=2-methylidene succinate, and tetraethylene glycol dimethacrylate.

The content ratio of the other monomer is generally 100 parts by weight or less, preferably 60 parts by weight or less with respect to 100 parts by weight of the total amount of the above-mentioned essential monomers (the compound of the formula (1) and the hydrophilic monomer).

(Polymer of the Present Invention)

A polymer of the present invention is obtained by polymerizing the monomer composition of the present invention.

The polymerization may be performed by a known method with a thermal polymerization initiator, which is typified by a peroxide or an azo compound, or a photopolymerization initiator being appropriately added.

When thermal polymerization is performed, a thermal polymerization initiator having a decomposition characteristic optimal for a desired reaction temperature may be selected and used. That is, a peroxide or azo compound having a 10-hour half-life temperature of from 40° C. to 120° C. is suitable. An example of the azo compound is 2,2'-azobis(isobutyronitrile) (AIBN).

Examples of the photopolymerization initiator may include a carbonyl compound, a sulfur compound, a halogen compound, and a metal salt.

Those polymerization initiators may be used alone or as a mixture thereof, and are preferably used at a ratio of from 0.2 part by weight to 2 parts by weight with respect to 100 parts by weight of the total amount of the compound of the formula (1) of the present invention and the hydrophilic monomer.

The synthesis of the polymer of the present invention may be performed in the presence of a solvent. The solvent may be any solvent that dissolves the monomer composition and does not react therewith, and examples thereof may include water, an alcohol-based solvent, a ketone-based solvent, an ester-based solvent, a linear or cyclic ether-based solvent, and a nitrogen-containing solvent. A preferred example is water or an alcohol, or a mixed solvent thereof.

Examples of the alcohol-based solvent include hexanol (HexOH), methanol, ethanol, n-propanol, and isopropanol.

Examples of the ketone-based solvent include acetone, methyl ethyl ketone, and diethyl ketone.

An example of the ester-based solvent is ethyl acetate.

Examples of the linear or cyclic ether-based solvent include ethyl cellosolve and tetrahydrofuran.

Examples of the nitrogen-containing solvent include acetonitrile and N-methylpyrrolidone.

The polymer of the present invention may be a polymer obtained by polymerizing any one of the following combinations of monomers.

The phosphorylcholine group-containing polysiloxane monomer of the present invention; 2-(methacryloyloxyethyl)-2-(trimethylammonioethyl) phosphate (MPC), hydroxypropyl methacrylate (HPMA), and N-vinylpyrrolidone (NVP) each serving as the hydrophilic monomer; and 2-hydroxy-3-(tris(trimethylsiloxy)silyl)propyl methacrylate (SiGMA) and tetraethylene glycol dimethacrylate (TEGDMA) each serving as the other monomer The phosphorylcholine group-containing polysiloxane monomer of the present invention; MPC, HPMA, and NVP each serving as the hydrophilic monomer; and 4-(2-hydroxyethyl)=1-[3-tris(trimethylsiloxy)silylpropyl]=2-methylidene succinate (ES) and TEGDMA each serving as the other monomer The phosphorylcholine group-containing polysiloxane monomer of the present invention; MPC, NVP, and 2-hydroxyethyl methacrylate (HEMA) each serving as the hydrophilic monomer; and SiGMA and TEGDMA each serving as the other monomer The phosphorylcholine group-containing polysiloxane monomer of the present invention; MPC, NVP, and N,N-dimethylacrylamide (DMAA) each serving as the hydrophilic monomer; and ES and TEGDMA each serving as the other monomer The phosphorylcholine group-containing polysiloxane monomer of the present invention; MPC, HPMA, and DMAA each serving as the hydrophilic monomer; and ES and TEGDMA each serving as the other monomer When the polymer of the present invention is obtained by polymerizing the phosphorylcholine group-containing polysiloxane monomer of the present invention, the hydrophilic monomer, and the other monomer, a weight ratio among the phosphorylcholine group-containing polysiloxane monomer, the hydrophilic monomer, and the other monomer is not particularly limited, but may be set to, for example, 10 to 60:40 to 90:0.01 to 60.

The present invention also encompasses a method of producing an ophthalmic device, including the following steps:

(I) a step of mixing the phosphorylcholine group-containing polysiloxane monomer of the present invention with at least a hydrophilic monomer to obtain a monomer composition; and (II) a step of polymerizing the monomer composition obtained in the step (I) to obtain a polymer.

The monomer composition of the step (I) may further contain another monomer.

The production method may further include the following step:

(III) a step of removing an unreacted component.

The phosphorylcholine group-containing polysiloxane monomer of the present invention may be used as a raw material for an ophthalmic device.

The ophthalmic device contains the polymer of the present invention.

The ophthalmic device is not particularly limited as long as the ophthalmic device is one to be used for an eye of an animal including a human. For example, the ophthalmic device may be a contact lens, a soft contact lens, a hard contact lens, an intraocular lens, or an artificial cornea, and is preferably a soft contact lens.

EXAMPLES

Now, the present invention is described in more detail by way of Examples and Comparative Examples, but the present invention is not limited thereto.

[Synthesis Example 1] Synthesis of Allyl Group-Containing Phosphorylcholine Compound Represented by Formula (5)

In a 1 L four-necked flask, 97.26 g (0.68 mol) of 2-chloro-2-oxo-1,3,2-dioxaphospholane (COP) was dissolved in 389.03 g of acetonitrile, and the whole was cooled to 5° C. or less in an ice bath. A solution obtained by dissolving 66.38 g (0.65 mol) of ethylene glycol monoallyl ether (manufactured by Tokyo Chemical Industry Co., Ltd.) and 69.07 g (0.68 mol) of triethylamine (manufactured by Kishida Chemical Co., Ltd.) in 135.45 g of acetonitrile in a 500 mL beaker was transferred to a 300 mL dropping funnel, and added dropwise into the previously prepared COP solution over 1 hour. Further, a reaction was performed in an ice bath for 4 hours. Triethylamine hydrochloride produced by the reaction was separated by filtration, and then 61.46 g (1.04 mol) of trimethylamine was loaded. The mixture was subjected to a reaction at 75° C. for 8 hours. After cooling, the produced target product was separated by filtration, and washed with 140 g of acetone twice. The solvent was removed under reduced pressure to afford 104.1 g of the product. It was confirmed by $^1$H NMR that the product was the compound of the formula (5) ("c" represented 1, and Z represented $CH_2$=$CHCH_2$—).

[Synthesis Example 2] Synthesis of Hydrosilyl Group-Containing Di-Methacrylate-Terminated Silicone Represented by Formula (4)

In a 500 mL light-shielding bottle, 17.24 g of FM-7711 (JNC Corporation, bi-terminal methacryloyloxypropylpolydimethylsiloxane (molecular weight≈1,000)), 150.0 g of octamethylcyclotetrasiloxane, 6.74 g of 1,3,5,7-tetramethylcyclotetrasiloxane, and 173.99 g of chloroform were mixed, and 1.50 g of trifluoromethanesulfonic acid was further added. The mixture was subjected to a reaction at 25° C. for 8 hours, and then washed with about 1,500 g of ion-exchanged water 5 times. After that, low-boiling components were removed under reduced pressure, 24.2 g of acetone and 120.1 g of methanol were added, and the whole was stirred. After the mixture had been left to stand still, an upper layer was discarded, and a lower layer was placed under reduced pressure to evaporate low-boiling components to afford 127.09 g of a transparent liquid. It was confirmed by $^1$H NMR that the liquid was the hydrosilyl group-containing silicone intermediate of the formula (4) (referred to as silicone intermediate 1).

$^1$H NMR Analysis Values

Peak area values for 2H of end double bonds at 5.54 ppm and 6.10 ppm (1.00+1.01=2.01)

An area value for 9H derived from a hydrosilyl group at 4.68 ppm (4.88)

A peak area value derived from siloxane at 0.16 ppm (651.67)

Calculation from the above-mentioned values found the following: a≈108, b=5, p=0, and q=0 in the structure of the formula (4), and number-average molecular weight Mn≈8,700. The number-average molecular weight is a value measured using a gel permeation chromatography (GPC) method and calculated using polymethyl methacrylate (PMMA) as a standard.

Analysis Conditions of Example 1

Analysis conditions of Example 1 are shown below.
$^1$H NMR Measurement Method
Measurement apparatus: JNM-AL400 manufactured by JEOL Ltd.
Solvent: $CDCl_3$ (TMS reference)

Components Used in Example 2 and Comparative Examples

Components, other than the polysiloxane monomer of the present invention, used in Example 2 and Comparative Examples are shown below.

Comparative Compound of the Formula (1)

PMPC: macromer having a phosphorylcholine functional group on a side chain (compound of Experiment Example 4 of Patent Literature 8)

FM-7721: JNC Corporation, bi-terminal methacryloyloxypolydimethylsiloxane (molecular weight≈5,000)

Other Monomer

SiGMA: 2-hydroxy-3-(tris(trimethylsiloxy)silyl)propyl methacrylate

ES: 4-(2-hydroxyethyl)=1-[3-tris(trimethylsiloxy)silylpropyl]=2-methylidene succinate TEGDMA: tetraethylene glycol dimethacrylate Hydrophilic Monomer MPC: 2-(methacryloyloxyethyl)-2-(trimethylammonioethyl)phosphate HPMA: hydroxypropyl methacrylate (a mixture of 2-hydroxypropyl ester and 2-hydroxy-1-methylethyl ester, manufactured by Nippon Shokubai Co., Ltd.)

NVP: N-vinylpyrrolidone

HEMA: 2-hydroxyethyl methacrylate

DMAA: N,N-dimethylacrylamide

Solvent

HexOH: hexanol

Initiator (Polymerization Initiator)

AIBN: 2,2'-azobis(isobutyronitrile) (10-hour half-life temperature: 65° C.)

Evaluation methods in Example 2 are as described below.

(Surface Hydrophilicity (WBUT) of Contact Lens)

The surface hydrophilicity of a contact lens was evaluated on the basis of a water film break up time (WBUT). Specifically, a contact lens ("film-shaped sample" in this Example) was immersed in ISO saline overnight, and was lifted off the water surface by holding its periphery with tweezers, and a period of time between the lifting from the water surface and the break-up of a water surface on the lens surface (water surface retention time) was measured. A state in which the water surface was broken up was judged by visual observation. The measurement was performed 3 times, and the average value thereof was determined. When the average value was 30 seconds or more, it was judged that the surface hydrophilicity was satisfactory.

(Mechanical Strength of Contact Lens)

The modulus [MPa] of a contact lens was measured with a BAS-3305(W) breaking strength analyzer manufactured by Yamaden Co., Ltd. in accordance with JIS-K7127, and its mechanical strength was evaluated. Specifically, a sample obtained by cutting a contact lens to a width of 2 mm was used and pulled at a speed of 1 mm/second with a distance between two clamps being set to 6 mm, and the modulus was measured by detection with a 200 gf load cell. When the modulus was 0.3 MPa or more and 0.7 MPa or less, it was judged that the mechanical strength was satisfactory.

(Oxygen Permeability of Contact Lens)

The oxygen permeability (Dk) of a sample obtained by stacking one to four contact lenses together was measured in accordance with a measurement method based on a polarography method described in ISO 18369-4. O2 Permeometer Model 201T of Rehder Development Company was used for the measurement. The thickness of the lens(es) and a t/Dk value determined by the measurement were plotted on the x-axis and the y-axis, respectively, and the inverse of the slope of the regression line of the plot was defined as the oxygen permeability (Dk) $\{(cm^2/sec)/(mL\ O^2/(mL \times mmHg))\}$. A larger oxygen permeability (Dk) indicates more satisfactory oxygen permeability. When the oxygen permeability (Dk) was 75 or more, it was judged that the oxygen permeability was particularly satisfactory.

Example 1-1

In a 100 mL three-necked flask, 10.00 g of the silicone intermediate 1 (hydrosilyl group-containing di-methacrylate-terminated silicone represented by the formula (4)) and 0.2140 g of the allyl group-containing phosphorylcholine compound represented by the formula (5) were dissolved in 10.00 g of 2-propanol, and the solution was heated to 80° C. using an oil bath, followed by the addition of 40 μL of a 4 wt % solution of hexachloroplatinic acid hexahydrate in 2-propanol.

A solution obtained by dissolving 1.93 g of the allyl group-containing phosphorylcholine compound represented by the formula (5) in 5.78 g of 2-propanol was loaded into a 10 mL dropping funnel, which was attached to an upper part of the three-necked flask.

The solution in the dropping funnel was added dropwise over 30 minutes while the mixture was kept at 80° C. After the dropwise addition, the mixture was subjected to a reaction for an additional 1 hour under reflux. Low-boiling components were evaporated under reduced pressure. After that, the residue was mixed with 33.18 g of ion-exchanged water, 11.05 g of ethanol, and 44.21 g of ethyl acetate, and the whole was stirred. After having been left to stand still, the mixture was separated into three layers. The upper layer and the lower layer were discarded, and then reduced-pressure evaporation from the middle layer under reduced pressure gave 7.31 g of a transparent gel-like product. It was confirmed by $^1$H NMR analysis that the product was the compound represented by the formula (1).

$^1$H NMR Analysis Values

Peak area values for 2H of end double bonds at 5.54 ppm and 6.10 ppm (1.00+1.00=2.00)

An area value for 9H derived from a choline group at 3.34 ppm (46.89)

A peak area value derived from siloxane at 0.16 ppm (646.15)

Calculation from the above-mentioned values found the following: a≈108, b=5, c=1, p=q=0, and X represents —CH$_2$CH$_2$— in the structural formula of the formula (1), and number-average molecular weight Mn≈10,000. The number-average molecular weight is a value measured using a gel permeation chromatography (GPC) method and calculated using polymethyl methacrylate (PMMA) as a standard under the following measurement conditions.

Eluent: tetrahydrofuran

Flow rate: 0.8 mL/min

Column: three PLgel mixed-E columns (connected in series)

Column temperature: 40° C.

Detector: differential refractometer

Example 1-2 to Example 1-4, Comparative Example 1-1, and Comparative Example 1-2

Example 1-2 to Example 1-4 were each performed in the same manner as Example 1-1 except that: the molecular weight and hydrosilyl group content ratio of the hydrosilyl group-containing di-methacrylate-terminated silicone of the formula (4) were changed; and the loading amount of the compound of the formula (5) was changed in proportion to the concentration of hydrosilyl groups. The molar ratios of the constituent units of the formula (1) in Example 1-1 to Example 1-4 and the calculation results of the number-average molecular weights thereof are shown in Table 1.

TABLE 1

|  | Example 1-1 | Example 1-2 | Example 1-3 | Example 1-4 | Comparative Example 1-1 | Comparative Example 1-2 |
|---|---|---|---|---|---|---|
| Formula (1) "a" | 108 | 20 | 500 | 52 | 600 | 10 |
| Formula (1) "b" | 5 | 1 | 70 | 7 | 1 | 1 |
| Formula (1) "c" | 1 | 1 | 1 | 1 | 1 | 1 |
| Formula (1) "p" | 0 | 0 | 0 | 0 | 0 | 0 |
| Formula (1) "q" | 0 | 0 | 0 | 0 | 0 | 0 |
| Formula (1) X | —CH$_2$CH$_2$— | —CH$_2$CH$_2$— | —CH$_2$CH$_2$— | —CH$_2$CH$_2$— | —CH$_2$CH$_2$— | —CH$_2$CH$_2$— |
| Number-average molecular weight | 10,000 | 2,000 | 42,000 | 4,600 | 45,000 | 1,200 |

Example 2-1

23.1 Parts by weight of MPC, 30.8 parts by weight of HPMA, 15.4 parts by weight of the compound produced in Example 1, 30.8 parts by weight of NVP, 53.1 parts by weight of SiGMA, 23.1 parts by weight of HexOH, 0.8 part by weight of TEGDMA, and 1.5 parts by weight of AIBN were stirred and mixed at room temperature for 1 hour to be uniformly dissolved to afford a monomer composition. Its composition is shown in Table 2.

0.3 g of the monomer composition was poured into a cell measuring 25 mm×70 mm×0.2 mm obtained by interposing a polyethylene terephthalate sheet having a thickness of 0.1 mm as a spacer between two polypropylene plates, and the resultant was placed in an oven. After the inside of the oven had been purged with nitrogen, the temperature was increased to 100° C., and the temperature was kept for 2 hours to polymerize the composition. Thus, a polymer was obtained.

The polymer was purified by being immersed in 40 g of 2-propanol for 4 hours, and then immersed in 50 g of ion-exchanged water for 4 hours to remove an unreacted material and the like. Further, the polymer was immersed in saline described in ISO-18369-3 to give a transparent film-shaped sample. The composition uniformity, polymerizability, polymerization product transparency, and hydrogel transparency of the sample were observed, and as a result, were each found to be satisfactory as shown in Table 2. The water content of the sample was measured, and the result was as shown in Table 2. The composition uniformity was checked by visually observing the monomer composition placed in a colorless and transparent container. For the polymerizability, the properties of a polymerization product obtained by polymerizing the monomer composition were checked by visual observation. For the polymerization product transparency, the transparency of the polymerization product obtained by polymerizing the monomer composition was checked by visual observation. For the hydrogel transparency, the transparency of a hydrogel obtained by swelling the polymerization product, obtained by polymerizing the monomer composition, in saline described in ISO-18369-3 was checked by visual observation. The water content was measured by a technique described in ISO-18369-4. Specifically, a hydrogel in an equilibrium water-containing state was dried, and its water content was calculated from a difference between weights before and after drying.

The surface hydrophilicity and mechanical strength of the film-shaped sample were evaluated by the above-mentioned methods. The results are shown in Table 2.

The oxygen permeability (Dk) of the film-shaped sample was evaluated by the above-mentioned method. The result is shown in Table 2.

Example 2-2 to Example 2-7

Example 2-2 to Example 2-7 were each performed in the same manner as in Example 2-1 except that a composition shown in Table was adopted. The results of evaluations of composition uniformity (○: transparent, x: clouded or precipitated), polymerizability (○: solid, x: viscous matter or liquid), polymerization product transparency (○: transparent, x: clouded), hydrogel transparency (○: transparent, x: clouded), water content, surface hydrophilicity, mechanical strength, and oxygen permeability (Dk) performed in the same manner as in Example 2-1 are shown in Table 2.

Comparative Example 2-1

Stirring and mixing were performed at room temperature in the same manner as in Example 2-1 except that, as shown in Table 3, 15.4 parts by weight of the compound of Comparative Example 1-1 was used in place of 15.4 parts by weight of the compound represented by the formula (1). However, a uniform solution was not obtained.

Comparative Example 2-2

A monomer composition was obtained through uniform dissolution by stirring and mixing for 1 hour in the same manner as in Example 2-1 except that, as shown in Table 3, 15.4 parts by weight of the compound of Comparative Example 1-2 was used in place of 15.4 parts by weight of the compound represented by the formula (1).

Comparative Example 2-3

Stirring and mixing were performed at room temperature in the same manner as in Example 2-1 except that, as shown in Table 3, 15.4 parts by weight of FM-7721 represented by the formula (4) was used in place of 15.4 parts by weight of the compound represented by the formula (1). However, a uniform solution was not obtained.

Comparative Example 2-4

A monomer composition was obtained through uniform dissolution by stirring and mixing for 1 hour in the same manner as in Example 2-1 except that, as shown in Table 3, 15.4 parts by weight of PMPC was used in place of 15.4 parts by weight of the compound represented by the formula (1).

TABLE 2

| Kind | Raw material | Example 2-1 Mixing ratio | Example 2-1 Part(s) by weight | Example 2-2 Mixing ratio | Example 2-2 Part(s) by weight | Example 2-3 Mixing ratio | Example 2-3 Part(s) by weight | Example 2-4 Mixing ratio | Example 2-4 Part(s) by weight |
|---|---|---|---|---|---|---|---|---|---|
| Compound of formula (1) | Example 1-1 | 10 | 15.4 | | | | | | |
| | Example 1-2 | | | 10 | 15.4 | | | | |
| | Example 1-3 | | | | | 20 | 30.8 | | |
| | Example 1-4 | | | | | | | 50 | 55.6 |
| | Comparative Example 1-1 | | | | | | | | |
| | Comparative Example 1-2 | | | | | | | | |
| Comparative compound of formula (1) | PMPC | | | | | | | | |
| | FM-7721 | | | | | | | | |
| Hydrophilic monomer | MPC | 15 | 23.1 | 15 | 23.1 | 15 | 23.1 | 5 | 5.6 |
| | HPMA | 20 | 30.8 | 20 | 30.8 | 10 | 15.4 | 5 | 5.6 |
| | NVP | 20 | 30.8 | 20 | 30.8 | 20 | 30.8 | 30 | 33.3 |
| | HEMA | | | | | | | | |
| | DMAA | | | | | | | | |
| Subtotal of monomers | — | 65 | 100.0 | 65 | 100.0 | 65 | 100.0 | 90 | 100.0 |
| Other monomer | SiGMA ES | 34.5 | 53.1 | 34.5 | 53.1 | 34.5 | 53.1 | 9.5 | 10.6 |
| | TEGDMA | 0.5 | 0.8 | 0.5 | 0.8 | 0.5 | 0.8 | 0.5 | 0.6 |
| Total of monomers | — | 100 | | 100 | | 100 | | 100 | |
| Solvent | HexOH | 15 | 23.1 | 20 | 30.8 | 20 | 30.8 | 20 | 22.2 |
| Initiator | AIBN | 1 | 1.5 | 1 | 1.5 | 1 | 1.5 | 1 | 1.1 |
| Polymerization step | Temperature | 100° C. | | 100° C. | | 100° C. | | 100° C. | |
| | Time | 2 hours | | 2 hours | | 2 hours | | 2 hours | |
| Evaluation item | | Evaluation result | | | | | | | |
| Composition uniformity | | ○ | | ○ | | ○ | | ○ | |
| Polymerizability | | ○ | | ○ | | ○ | | ○ | |
| Polymerization product transparency | | ○ | | ○ | | ○ | | ○ | |
| Hydrogel transparency | | ○ | | ○ | | ○ | | ○ | |
| WBUT [s] | | >30 | | >30 | | >30 | | >30 | |
| Water content [%] | | 55 | | 45 | | 60 | | 40 | |
| Modulus [MPa] | | 0.5 | | 0.7 | | 0.4 | | 0.7 | |
| Oxygen permeability (Dk) | | 80 | | 100 | | 75 | | 100 | |

| Kind | Raw material | Example 2-5 Mixing ratio | Example 2-5 Part(s) by weight | Example 2-6 Mixing ratio | Example 2-6 Part(s) by weight | Example 2-7 Mixing ratio | Example 2-7 Part(s) by weight |
|---|---|---|---|---|---|---|---|
| Compound of formula (1) | Example 1-1 | 10 | 15.4 | | | 10 | 15.4 |
| | Example 1-2 | | | | | | |
| | Example 1-3 | | | 20 | 30.8 | | |
| | Example 1-4 | | | | | | |
| | Comparative Example 1-1 | | | | | | |
| | Comparative Example 1-2 | | | | | | |
| Comparative compound of formula (1) | PMPC | | | | | | |
| | FM-7721 | | | | | | |
| Hydrophilic monomer | MPC | 15 | 23.1 | 15 | 23.1 | 15 | 23.1 |
| | HPMA | 20 | 30.8 | | | 20 | 30.8 |
| | NVP | 20 | 30.8 | 20 | 30.8 | | |
| | HEMA | | | 10 | 15.4 | | |
| | DMAA | | | | | 20 | 30.8 |
| Subtotal of monomers | — | 65 | 100.0 | 65 | 100.0 | 65 | 100.0 |

TABLE 2-continued

| | | | | | | | |
|---|---|---|---|---|---|---|---|
| Other monomer | SiGMA | | | 34.5 | 53.1 | | |
| | ES | 34.5 | 53.1 | | | 34.5 | 53.1 |
| | TEGDMA | 0.5 | 0.8 | 0.5 | 0.8 | 0.5 | 0.8 |
| Total of monomers | — | 100 | | 100 | | 100 | |
| Solvent | HexOH | 10 | 15.4 | 20 | 30.8 | 10 | 15.4 |
| Initiator | AIBN | 1 | 1.5 | 1 | 1.5 | 1 | 1.5 |
| Polymerization step | Temperature | 100° C. | | 100° C. | | 100° C. | |
| | Time | 2 hours | | 2 hours | | 2 hours | |
| Evaluation item | | | | Evaluation result | | | |
| Composition uniformity | | ○ | | ○ | | ○ | |
| Polymerizability | | ○ | | ○ | | ○ | |
| Polymerization product transparency | | ○ | | ○ | | ○ | |
| Hydrogel transparency | | ○ | | ○ | | ○ | |
| WBUT [s] | | >30 | | >30 | | >30 | |
| Water content [%] | | 50 | | 55 | | 45 | |
| Modulus [MPa] | | 0.6 | | 0.6 | | 0.7 | |
| Oxygen permeability (Dk) | | 90 | | 80 | | 100 | |

TABLE 3

| | | Comparative Example 2-1 | | Comparative Example 2-2 | | Comparative Example 2-3 | | Comparative Example 2-4 | |
|---|---|---|---|---|---|---|---|---|---|
| Kind | Raw material | Mixing ratio | Part(s) by weight | Mixing ratio | Part(s) by weight | Mixing ratio | Part(s) by weight | Mixing ratio | Part(s) by weight |
| Compound of formula (1) | Example 1-1 | | | | | | | | |
| | Example 1-2 | | | | | | | | |
| | Example 1-3 | | | | | | | | |
| | Example 1-4 | | | | | | | | |
| | Comparative Example 1-1 | 10 | 15.4 | | | | | | |
| | Comparative Example 1-2 | | | 10 | 15.4 | | | | |
| Comparative compound of formula (1) | PMPC | | | | | | | 10 | 15.4 |
| | FM-7721 | | | | | 10 | 15.4 | | |
| Hydrophilic monomer | MPC | 15 | 23.1 | 15 | 23.1 | 15 | 23.1 | 15 | 23.1 |
| | HPMA | 20 | 30.8 | 20 | 30.8 | 20 | 30.8 | 20 | 30.8 |
| | NVP | 20 | 30.8 | 20 | 30.8 | 20 | 30.8 | 20 | 30.8 |
| | HEMA | | | | | | | | |
| | DMAA | | | | | | | | |
| Subtotal of monomers | — | 65 | 100.0 | 65 | 100.0 | 65 | 100.0 | 65 | 100.0 |
| Other monomer | SiGMA | | | | | | | | |
| | ES | 34.5 | 53.1 | 34.5 | 53.1 | 34.5 | 53.1 | 34.5 | 53.1 |
| | TEGDMA | 0.5 | 0.8 | 0.5 | 0.8 | 0.5 | 0.8 | 0.5 | 0.8 |
| Total of monomers | — | 100 | | 100 | | 100 | | 100 | |
| Solvent | HexOH | 15 | 23.1 | 15 | 23.1 | 15 | 23.1 | 15 | 23.1 |
| Initiator | AIBN | 1 | 1.5 | 1 | 1.5 | 1 | 1.5 | 1 | 1.5 |
| Polymerization step | Temperature | 100° C. | | 100° C. | | 100° C. | | 100° C. | |
| | Time | 2 hours | | 2 hours | | 2 hours | | 2 hours | |
| Evaluation item | | | | | | Evaluation result | | | |
| Composition uniformity | | × | | ○ | | × | | ○ | |
| Polymerizability | | The evaluation was stopped because uniform dissolution was not achieved. | | ○ | | The evaluation was stopped because uniform dissolution was not achieved. | | ○ | |
| Polymerization product transparency | | | | ○ | | | | ○ | |
| Hydrogel transparency | | | | ○ | | | | ○ | |
| WBUT [s] | | | | >30 | | | | >30 | |
| Water content [%] | | | | 40 | | | | 55 | |
| Modulus [MPa] | | | | 2.4 | | | | 0.5 | |
| Oxygen permeability (Dk) | | | | 80 | | | | 60 | |

As apparent from the results of Table 2 and Table 3, in each of Example 2-1 to Example 2-7, Comparative Example 2-2, and Comparative Example 2-4, the WBUT evaluation was more than 30 seconds, indicating satisfactory surface hydrophilicity.

Meanwhile, in each of Comparative Example 2-1 and Comparative Example 2-3, a uniform composition was unable to be obtained.

In each of Example 2-1 to Example 2-7 and Comparative Example 2-4, the modulus fell within the range of 0.3 MPa or more and 0.7 MPa or less, indicating satisfactory mechanical strength.

Meanwhile, in Comparative Example 2-2, the modulus was 2.4, and hence the mechanical strength was inappropriate for a soft contact lens.

In each of Example 2-1 to Example 2-7 and Comparative Example 2-2, the oxygen permeability (Dk) was 75 or more, indicating a particularly satisfactory oxygen permeability (Dk).

Meanwhile, in Comparative Example 2-4, the oxygen permeability (Dk) was 60, and hence the oxygen permeability (Dk) was unsatisfactory. In Comparative Example 2-4, PMPC having a structure similar to the formula (1) was used in place of the compound represented by the formula (1), and the above-mentioned result was able to confirm that it was difficult to increase the oxygen permeability of a contact lens produced with a monomer other than the formula (1).

Thus, it was confirmed that the polymer obtained by polymerizing the monomer composition containing the polysiloxane monomer represented by the formula (1) was capable of producing a soft contact lens having satisfactory surface hydrophilicity, appropriate mechanical strength, and a satisfactory oxygen permeability (Dk).

As described above, it was confirmed that the phosphorylcholine group-containing polysiloxane monomer of the present invention simultaneously satisfied surface hydrophilicity, appropriate mechanical strength, and oxygen permeability when copolymerized with a polymerizable monomer, such as a hydrophilic monomer, and hence was useful as a polysiloxane monomer to be used as a raw material for an ophthalmic device.

INDUSTRIAL APPLICABILITY

The polysiloxane monomer having a phosphorylcholine group, which simultaneously satisfies surface hydrophilicity, appropriate mechanical strength, and oxygen permeability when copolymerized with a polymerizable monomer, such as a hydrophilic monomer, and which is used as a raw material for an ophthalmic device, can be provided.

The invention claimed is:
1. A phosphorylcholine group-containing polysiloxane monomer, which is represented by the formula (1):

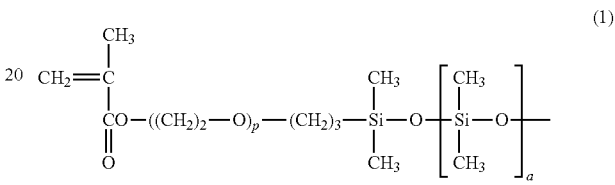

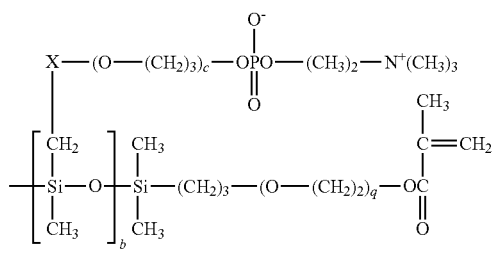

where "a" represents an integer of from 20 to 500, "b" represents an integer of from 1 to 70, "c" represents 0 or 1, "p" and "q" each represent 0 or 1, and X represents $-CH_2-$ or $-CH_2CH_2-$.

2. A method of producing a phosphorylcholine group-containing polysiloxane monomer represented by the formula (1), the method comprising a step of subjecting a hydrosilyl group-containing di-methacrylate-terminated silicone represented by the formula (4) and an allyl group-containing phosphorylcholine compound represented by the formula (5) to an addition reaction:

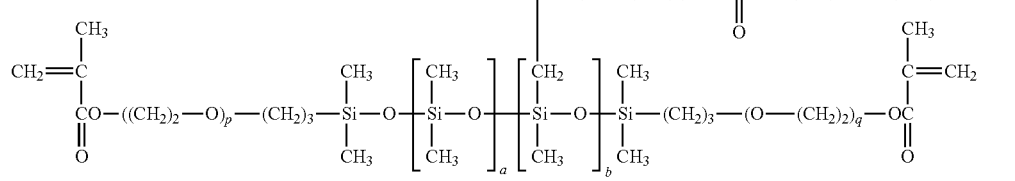

where "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—;

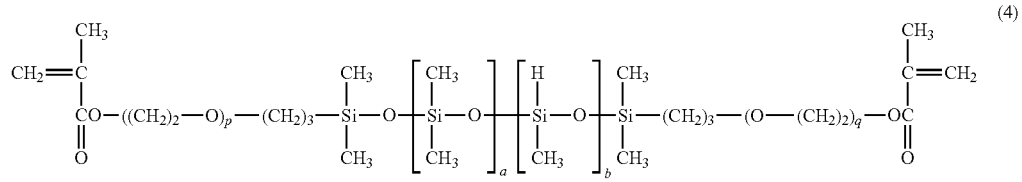

where "a" represents an integer of from 20 to 500, "b" represents an integer of from 1 to 70, and "p" and "q" each represent 0 or 1;

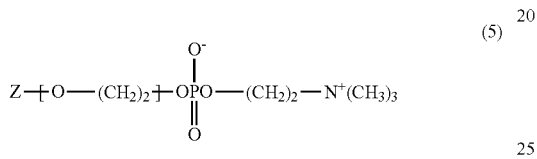

where "c" represents 0 or 1, and Z represents CH$_2$=CHCH$_2$— or CH$_2$=CH—.

3. A monomer composition, comprising:
10 parts by weight to 60 parts by weight of a phosphorylcholine group-containing polysiloxane monomer represented by the formula (1); and
40 parts by weight to 90 parts by weight of one kind or a plurality of kinds of hydrophilic monomers:

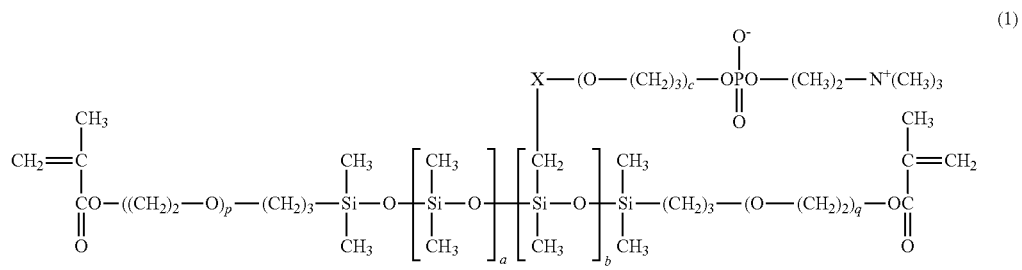

where "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

4. The monomer composition according to claim 3, wherein the hydrophilic monomers are any one or more selected from the group consisting of 2-hydroxyethyl (meth)acrylate, N-vinylpyrrolidone, N,N-dimethylacrylamide, 2-(methacryloyloxyethyl)-2-(trimethylammonioethyl) phosphate, methyl methacrylate, and hydroxypropyl (meth)acrylate.

5. A polymer, which is obtained by polymerizing the monomer composition of claim 3.

6. A polymer, which is obtained by polymerizing the monomer composition of claim 4.

7. The composition according to claim 1, wherein the composition is a composition for an ophthalmic device.

8. The composition according to claim 3, wherein the composition is a composition for an ophthalmic device.

9. An ophthalmic device, comprising the polymer of claim 4.

10. An ophthalmic device, comprising the polymer of claim 5.

* * * * *

UNITED STATES PATENT AND TRADEMARK OFFICE
CERTIFICATE OF CORRECTION

PATENT NO. : 11,851,516 B2
APPLICATION NO. : 17/045032
DATED : December 26, 2023
INVENTOR(S) : Yosuke Matsuoka et al.

Page 1 of 1

It is certified that error appears in the above-identified patent and that said Letters Patent is hereby corrected as shown below:

In the Specification

Column 5, Lines 16-20, Column 10, Lines 32-36 delete "

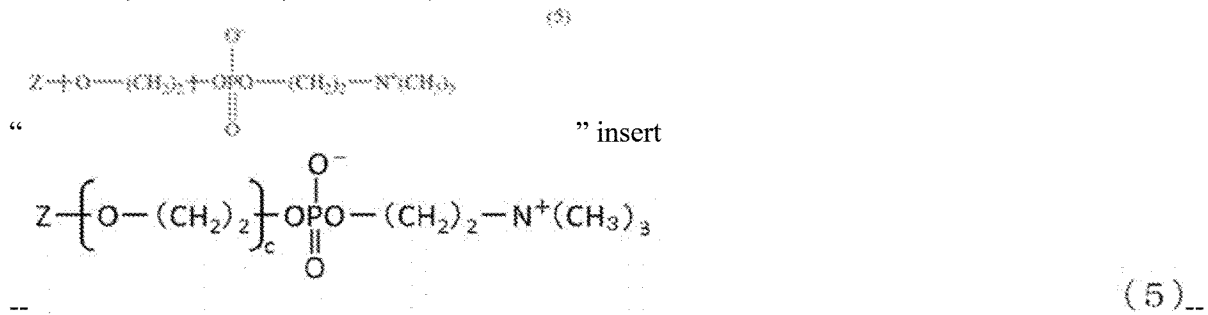

" insert

-- (5) --

In the Claims

In Claim 2 at Column 25, Lines 19-25 delete "

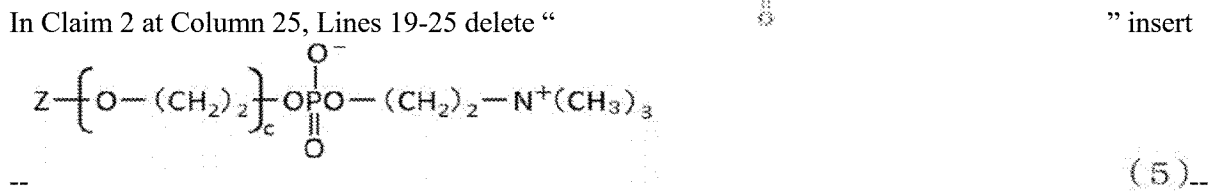

" insert

-- (5) --

Signed and Sealed this
Thirty-first Day of December, 2024

Derrick Brent
*Acting Director of the United States Patent and Trademark Office*